INVENTOR.
Andrew Hufnagel.
BY W. L. Stout,
HIS ATTORNEY

United States Patent Office 3,217,129
Patented Nov. 9, 1965

3,217,129
VISUAL INDICATOR FOR DETERMINING THE CONDITION OF AN ELECTROMAGNETIC RELAY
Andrew Hufnagel, Penn Hills Township, Allegheny County, Pa., assignor to Westinghouse Air Brake Company, Swissvale, Pa., a corporation of Pennsylvania
Filed Mar. 11, 1963, Ser. No. 264,100
9 Claims. (Cl. 200—167)

My invention relates to indicators and more particularly to an improved visual indicator for observing the specific condition of an electromagnetic relay.

In certain instances, it is desirable to determine the state of an electromagnetic relay at a given time; however, in some cases such a determination of the relay condition is often difficult and occasionally impossible. For example, one type of relay used in diesel locomotives is mounted in such a manner that visual observation of the relay condition is not possible without the aid of an indicating device. While it may be feasible to determine the condition of the relay by connecting an electrical measuring instrument across selected ones of its terminals, this procedure is time consuming, expensive, inconvenient and at times impossible, for example, when a measuring instrument is unavailable. Further, while previous attempts have been made to construct a mechanical relay indicator which would reliably indicate the state of an electromagnetic relay none possessed all the qualities required of such an indicating device. These necessary qualities, generally speaking, are simplicity of design, low cost of manufacture, ease of installation and removal, reliability in use, light weight, small space requirement, undisturbed by vibrations, low energy consumption and long life.

Accordingly, it is an object of my present invention to provide an improved visual mechanical indicator for reliably indicating the functional condition of an electromagnetic relay.

A further object of my invention is to provide a simple two piece relay indicating device supported solely by the relay proper so that no exact relationship need exist between relay and housing prior to mounting of the indicating device.

A still further object of my invention is to provide a small, inexpensive, reliable, simple, light and easily installed and removable electromagnetic relay position indicator which is not susceptible to surrounding vibrations, requires very little energy for actuation and has a long life.

Other objects and further advantages of my invention will become apparent to those skilled in the art as the description proceeds.

In brief, the objects of my invention are achieved by providing a two piece indicator comprising a shutter element which is pivotally mounted between a fixed and movable member of an electromagnetic relay and a retaining spring which cooperates with the shutter to hold it in place between the two relay members. More specifically, my indicator has been suitably adapted for use with the type of electromagnetic relay shown in my United States Patent No. 2,897,317, issued July 28, 1959, which is assigned to the assignee of my present application. In practice, the indicator element pivots about the fixed contact ladder between a first and a second indicating position in response to the movement of the operating contact ladder which is imparted thereto by means of the relay armature. The retaining spring is fixedly mounted to and operates jointly with the fixed contact ladder and the shutter element for properly holding the indicator element in aligned relationship with the two ladders.

Upon energization of the relay, the armature moves the operating ladder downwardly which in turn results in the indicator shutter element being moved from the first to the second indicating position thereby designating that the relay is in its picked up position. When electrical power is removed from the relay, restoring springs provide an upward vertical motion to the operating ladder which in turn restores the indicator shutter element to its first position thereby designating that the relay is in its released position.

I shall describe one form of visual indicator embodying my invention, and will then point out the novel features thereof in the appended claims.

My invention will be better understood after a consideration of the following detailed description and with reference to the accompanying drawings wherein.

Figure 1:
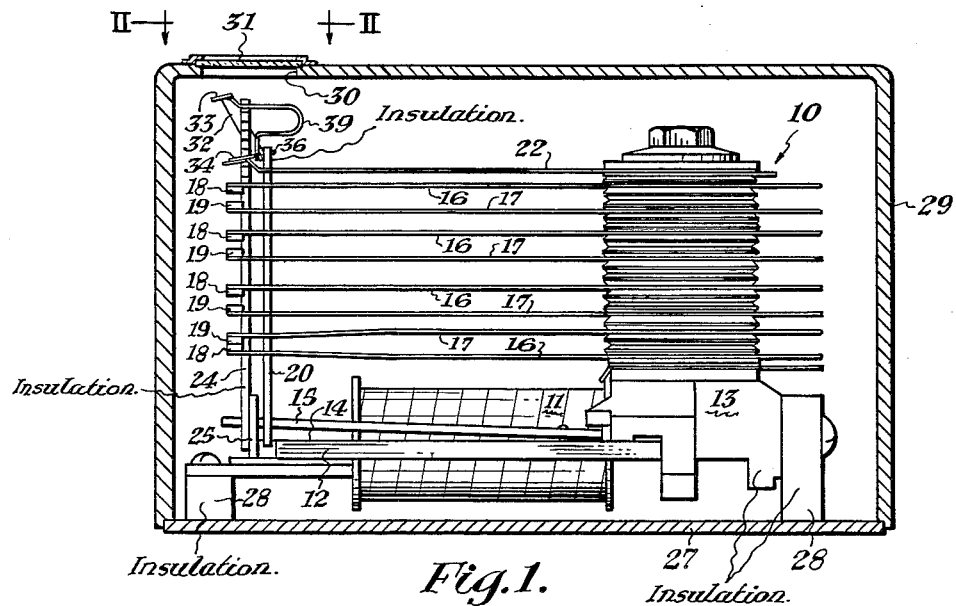
FIG. 1 is a side elevational view, partly in section, showing my novel indicator applied to a conventional electromagnetic relay.

Referring first to FIG. 1, I have shown a conventional multicontact relay 10, which may be of the type shown and described in my United States Patent No. 2,897,317, mentioned above. As described in the patent, the relay generally comprises an energizing coil 11 mounted on the center leg of an E-shaped rectangular core 12 which is secured at one end to the base of a block of insulating material 13. Pivotally mounted to cooperate with the upper face 14 of the core 12 is a U-shaped armature 15 which extends rearwardly along the outer legs of core 12 on either side of coil 11 in such a position that the bight of the U will cooperate with the forwardmost end of core face 14 in the energized condition of coil 11.

A contact stack, comprising a plurality of contact springs 16, 17, is mounted in spaced relation to block 13. The movable contact springs 16 and the fixed contact springs 17 extend forwardly of the block 13 in approximate parallelism and have contact tip points 18 and 19, respectively, at the forwardmost ends of the contact springs so that upon any contact closure the points on the cooperating fixed and movable springs are brought into engagement. The action of the movable springs 16 is controlled by a movable or operating ladder 20 of insulating material provided with projecting shoulders, shown in greater detail in FIGS. 2 and 15 of my abovementioned United States Patent No. 2,897,317, which engage the contact springs 16 in appropriate conditions of coil 11. The ladder shoulders will engage "front" contact springs 16 (uppermost three in FIG. 1) with coil deenergized, but lowermost "back" contact spring 16 when coil is energized. The ladder 20 cooperates with the armature 15 and is forced downwardly, upon energization of coil 11, by engagement of a forwardly extending portion of armature 15 with a surface provided in the lower portion of ladder 20.

Figure 3:
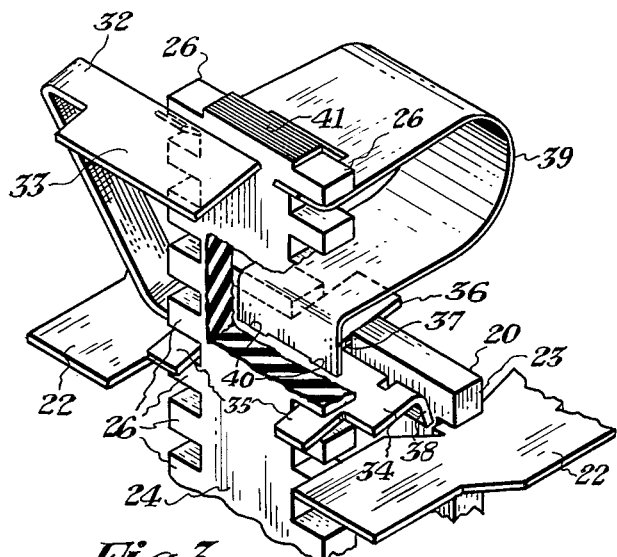
FIG. 3 is an enlarged cut-away perspective view of the indicator shown in FIGS. 1 and 2.

As best shown in FIGS. 1 and 3, restoring springs 22 at the top of the contact stack continuously engage the uppermost shoulders 23 of the movable ladder 20 and are pretensioned upwardly to supply a vertical biasing force which restores the armature 15 and movable ladder 20 to their unoperated positions upon deenergization of the relay coil 11. Further, a fixed ladder 24, of insulating material positioned in front of movable ladder 20, is connected by means of a fixed ladder plate 25 to the forward portion of core 12, and is provided with projecting shoulders 26, which securely engage a portion of the tip ends of fixed contact springs 17 to prevent any movement whatsoever in these springs, as described in detail in my above-mentioned patent.

In operation upon the deenergization of the relay coil 11, restoring springs 22 raise movable ladder 20, lifting springs 16 and their contact points 18 out of engagement or letting them move into engagement with points 19 of fixed springs 17, all depending upon the position of each of springs 16 with respect to its corresponding spring 17. Thus, for example, those springs 16 which are positioned above their corresponding fixed springs 17 will be shifted upwardly causing their contact points 19 to separate from engagement with corresponding contact points 18. As for those springs 16 which are positioned below their corresponding fixed springs 17, when allowed to move upwardly their contact points 18 will be brought into engagement with contact points 19. When coil 11 is energized, the downward movement of armature 15 and thus ladder 20 toward core 12 will reverse the above engagement and disengagement of the contacts 18 and 19.

As shown in FIG. 1 the multicontact relay assembly, in turn, is securely fastened to a base plate 27, for example, by means insulating columns 28 located at the forwardmost and rearwardmost ends of the assembly. An opaque cover 29, of any suitable material, cooperates with the base plate 27 and forms a substantially dust-proof and moisture-proof housing for the relay assembly. The housing is provided with a window consisting of an aperture 30 covered by a transparent plate 31, of glass or clear plastic, fixedly secured, in any convenient manner, to the front surface of cover 29. The placement of the window is dictated by the fact that only the front surface of the housing will be exposed and readily accessible when the assembled relay is mounted on a panel board for service operation. However, since the motion of various movable relay parts is normal or at a right angle to the plane of the window, visual observation of the functional position of the relay is not possible without the aid of a motion translating indicator.

The means for indicating the relative functional position of the relay at any given time consists of a two piece mechanically responsive indicator which is solely supported on the relay proper. As best shown in FIG. 3, the indicator comprises a substantially U-shaped metallic shutter element 32 having an upper flat portion 33, and an irregularly preformed lower portion 34 which mutually cooperates with the fixed and movable ladders 24 and 20. The lower portion 34 is provided with two tabs or ears 35 interposed between the projecting shoulders 26 of fixed ladder 24 for pivotally supporting the shutter element thereabout and for longitudinally positioning it, and a similar diametrically opposed tab or ear 36 which cooperates with a notch 37 located in the top of movable ladder 20. Further, the lower portion 34 is provided with two downwardly bent tabs 38, only one being shown in FIG. 3, located adjacent shoulders 23 of movable ladder 20 for transversely positioning it and for preventing the lower portion 34 from moving out of engagement with the operating ladder 20.

Figure 4:
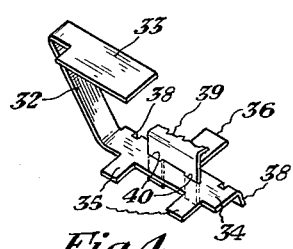
FIG. 4 is a fragmentary perspective view of the shutter element and retaining spring.

An arched retaining spring 39 is mounted for engagement with the fixed ladder 24 and lower portion 34 of the shutter element 32 and firmly maintains contact between the lower portion 34 and ladder members 20 and 24. The upper end of spring 39 is bifurcated with each branch of the bifurcation bent upwardly, viewing FIG. 3 the left branch shown in dotted lines, to hook under the uppermost shoulders 26 of the fixed ladder 24. As shown in FIG. 3, but more clearly illustrated in FIG. 4, the other end of spring 39 is of reduced width and is provided with bifurcations which extend downwardly through apertures or slotted openings 40 appropriately located in the lower portion 34. The spring 39 is under constant compression, and the pressure exerted thereby causes the lower portion 34 of shutter element 32 to maintain a small downward force against horizontal surfaces of both ladder members so that lower portion 34 will remain in constant contact with these surfaces.

Figure 2:
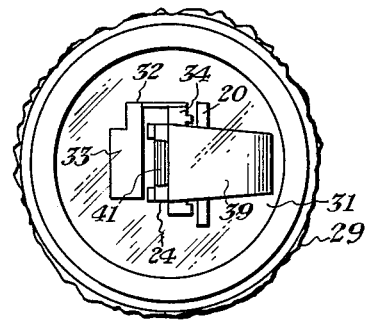
FIG. 2 is a partial sectional view of the assembly shown in FIG. 1 taken substantially along line II—II of FIG. 1.

In operation, the functional condition of the relay can be readily determined by merely peering through the window and observing the position of the shutter element 32. If the relay 10 is deenergized, the shutter element 32 assumes the position as shown in the drawings and reveals a painted red indicia 41 located on top of the fixed ladder 24 thereby designating that the relay armature is in its released condition. Under this condition, an observer looking through the window would see the relationship as shown in FIG 2, and would immediately recognize a released state of the relay armature. Assuming now that the relay is energized, the shutter element 32 undergoes a transition which results in the upper flat portion 33 being placed in a position directly above the painted mark 41 so that an observer looking through the window is unable to see the red indicia 41. Under this condition an observer immediately recognizes that the relay armature is in its picked up condition.

Again, initially assuming the relay is deenergized, with the parts in the position as shown in the drawings, the sequence of operation is substantially as follows. Viewing FIG. 1, upon energization of the coil 11 the armature 15 overcomes the force exerted thereon by springs 22 and is attracted toward core 12 which results in a downward movement of the operating ladder 20. As the operating ladder 20 moves downwardly the compressive force of spring 39 causes the tab 36 of the lower portion 34 to follow therewith. This following movement of tab 36 causes the shutter element 32 to pivot about an axis located at points where tabs 35 rest on shoulders 26 of the fixed ladder 24. The parts being so proportioned that upon completion of the armature movement the upper portion 33 of shutter element 32 reaches a position directly above and completely covers the red indicia 41. Now when the coil 11 is deenergized, the restoring springs 22 which provide an upward biasing force tend to return the armature 15 and operating ladder 20 to their normal unoperated positions. This upward biasing force of restoring springs 22 overcomes the small downward force of the spring 39 and operating ladder 20 moves tab 36 upwardly so that shutter element 32 pivots about its point of resting on the fixed ladder 24, and the upper portion 33 of shutter element 32 moves counterclockwise, viewing FIG. 1, and exhibits the red indicia 41.

While I have illustrated my indicator apparatus as revealing the painted red indicia during a released condition of the relay, it is readily apparent that the alternative, of showing the red indicia during a picked up condition, is merely dependent upon the initial positioning of the shutter element. In other words, the shutter element 32 may be initially adjusted to cover the red mark 41 during a deenergized state of the relay so that when the relay becomes energized and the armature picks up the shutter element 32 rotates clockwise thereby exposing the red indicia 41.

It should be pointed out that the indicator embodying my invention may be advantageously used in any situation where the relay is mounted in such position that its contacts and armature are not readily observable. Further, since the indicator is entirely carried and supported by the relay proper no exact relationship is required between the relay and housing, and therefore the indicator may equally well be used without a housing.

Although I have herein shown and described only one form of an indicator embodying my invention, it is understood that various changes and modifications may be made therein within the scope of the appended claims without departing from the spirit and scope of my invention.

Having thus described my invention, what I claim is:

1. A visual indicator for determining the picked-up and released condition of a relay armature of an electromagnetic relay, comprising in combination, a movable insulating member adapted to be securely connected to the relay armature and movable therewith, a fixed insulating member disposed adjacent said movable insulating member, an indicating element pivotally supported by said insulating members and adapted to move between a first and a second indicating position thereby designating the picked-up and released condition of the relay armature, and a retaining spring engaging said indicating element and said fixed insulating member to hold said element in proper relation with said insulating members.

2. A relay indicator comprising, an indicating element having a first portion pivotally supported by adjacently disposed fixed and movable members of an electromagnetic relay, a retaining spring cooperating with said element and said fixed member for holding said element in proper relation with said fixed and movable members, said element having a second portion remote from its first portion adapted to move between a first and a second indicating position in response to the movement of said movable member, said movable member adapted to move from a first to a second position in response to a force applied thereto, and means biasing said movable member to said first position in absence of said force.

3. A visual indicator for determining the relative position of a relay armature of an electromagnetic relay at any given time, comprising in combination, an operating insulating ladder adapted to be securely attached to the relay armature and movable therewith, a fixed insulating ladder positioned adjacent said operating insulating ladder, an indicating element pivotally supported by said insulating ladders, a retaining spring cooperating with said indicating element and said fixed insulating ladder to hold said element in proper relation to said insulating ladders, and said indicating element including a portion remote from its pivoted support adapted to move from a first to a second indicating position in response to the movement imparted to said operating ladder when the relay armature is picked up, and adapted to move from said second to said first indicating position when the relay armature is returned to its released condition.

4. An apparatus for indicating the relative position of an armature of an electromagnetic relay, comprising in combination, an operating contact ladder adapted to be attached to and movable with the relay armature, a fixed contact ladder disposed adjacent said operating contact ladder, a shutter element pivotally supported by said contact ladders and adapted to cover and expose an indicia on said fixed contact ladder, and spring means with one end thereof engaging said shutter element and having an opposite end engaging said fixed contact ladder for retaining said element in proper relation with said contact ladders so that said shutter element covers the indicia when the relay armature is in its picked-up position and exposes the indicia when the relay armature is in its released position.

5. An apparatus for indicating the picked-up and released condition of an armature of an electromagnetic relay, comprising in combination, a housing adapted to enclose the electromagnetic relay and having an aperture therein, a shutter element pivotally supported by an adjacently disposed fixed member securely attached within said housing and a movable member adapted to be securely fastened to the relay armature, said shutter element adapted to move between a first and a second indicating position in response to the pickup and release movements of the relay armature, and a spring compressed between said shutter element and said fixed member so that said shutter element moves to cover an indicia within said housing when the relay armature is picked up and moves to uncover the indicia when the relay armature is released thereby visually indicating the condition of the relay armature.

6. A visual indicator for determining the picked-up and released condition of a relay armature of an electromagnetic relay, comprising in combination, an operating insulating ladder adapted to be securely attached to the relay armature and movable therewith, a fixed insulating ladder disposed adjacent said operating insulating ladder, a shutter element having first and second end portions formed at angles with a central portion, said first end portion pivotally supported by said insulating members and adapted to move said second end portion between a first and a second indicating position thereby designating the picked-up and released condition of the relay armature and a retaining spring engaging said first end portion and said fixed insulating ladder to hold said shutter element in proper relation with said insulating members.

7. A relay indicator comprising, a U-shaped indicating element having one portion pivotally supported by adjacently disposed fixed and movable members of an electromagnetic relay, an arched spring cooperating with said one portion of said U-shaped element and said fixed member for urging said one portion in constant contact with said fixed and movable members, the other portion of said U-shaped element being located remote from said one portion of said U-shaped element and adapted to move between a first and a second indicating position in response to the movement of said movable member, said movable member adapted to move from a first to a second position in response to energization of the electromagnetic relay, and means normally biasing said movable member to said first position during deenergization of the electromagnetic relay.

8. A visual indicator for determining the relative position of a relay armature of an electromagnetic relay at any given time, comprising in combination, an operating insulating ladder adapted to be securely attached to the relay armature and movable therewith, a fixed insulating ladder positioned adjacent said operating insulating ladder, an indicating element having a portion pivotally mounted by said insulating ladders, a spring cooperating with said indicating element and said fixed insulating ladder for constantly urging said element in contact with said insulating ladders, said indicating element including a portion remote from its pivotally mounted portion adapted to move from a first to a second indicating position in response to the movement initiated to said operating ladder when the relay armature is picked up and adapted to move from said second to said first indicating position when the relay armature is released, and a housing having an aperture therein for visually exhibiting the position of said indicating element.

9. An apparatus for indicating the condition of an armature of an electromagnetic relay, comprising in combination, an operating contact ladder adapted to be attached to and movable with the relay armature, a fixed contact ladder disposed adjacent said operating contact ladder, a shutter element pivotally supported by said contact ladders and adapted to cover and expose an indicia on said fixed contact ladder, a spring having one end thereof engaging said shutter element and having an opposite end engaging said fixed contact ladder for holding said element in constant contact with said contact ladders so that said shutter element covers the indicia when the relay armature is in the picked-up condition and exposes the indicia when the relay armature is in the released condition, and a housing adapted to enclose the electromagnetic relay and having an aperture therein for visually exhibiting the condition of the electromagnetic relay.

References Cited by the Examiner

UNITED STATES PATENTS 1,307,710   6/19   Taylor et al. _____ 340—124

BERNARD A. GILHEANY, *Primary Examiner.*

ROBERT K. SCHAEFER, *Examiner.*